United States Patent [19]

Merkley et al.

[11] 4,262,750

[45] Apr. 21, 1981

[54] SHAKER CHAIN DRIVE ASSEMBLY FOR TOMATO HARVESTER OR THE LIKE

[76] Inventors: Michael J. Merkley, Rte. 1, Box 70, Dixon, Calif. 95620; Stephen E. Jacobs, 2691 Tam O'Shanter Dr., El Dorado Hills, Calif. 95630; Edward L. Straub, 1061 Oak Tree La., Springfield, Mo. 65800

[21] Appl. No.: 71,000

[22] Filed: Aug. 30, 1979

[51] Int. Cl.³ ............................................. A01D 17/08
[52] U.S. Cl. .................................... 171/27; 56/16.5; 56/327 R; 56/DIG. 2; 130/30 R; 209/365 R
[58] Field of Search ............. 56/327 R, 16.5, DIG. 2; 130/30 R; 171/14, 27, 28, 126, 127; 209/308, 365 R, 365 C, 365 A, 367; 198/759, 768; 74/394

[56] References Cited

U.S. PATENT DOCUMENTS

| | | | |
|---|---|---|---|
| 2,734,537 | 2/1956 | Geisler | 209/365 R |
| 3,364,770 | 1/1968 | Button et al. | 198/759 |
| 3,603,168 | 9/1971 | Kaplan | 74/394 |
| 3,666,017 | 5/1972 | Gates et al. | 171/27 |
| 3,721,132 | 3/1973 | Johnson | 74/394 |

*Primary Examiner*—Jay N. Eskovitz
*Attorney, Agent, or Firm*—Lothrop & West

[57] ABSTRACT

The drive unit of a conventional mechanically actuated shaker for removing comestibles from their support vines is supplanted by a pair of hydraulic motors capable of effecting extremely rapid forward and reverse movement of the shaker. An adjustable multivibrator circuit produces electrical pulses of predetermined duration and frequency. The pulses activate a solenoid-operated hydraulic valve supplying first the forward motor and then the reverse motor with hydraulic fluid. The quick, snapping action of the shaker afforded by the electro-hydraulic drive apparatus effectively denudes the plants or vines of their fruit.

7 Claims, 6 Drawing Figures

4,262,750

SHAKER CHAIN DRIVE ASSEMBLY FOR TOMATO HARVESTER OR THE LIKE

BACKGROUND OF THE INVENTION

In-field use of the earliest mechanical tomato harvesters pointed to the need for a more resilient tomato. While greatly reducing labor and time requirements associated with harvesting, the mechanical harvesters caused considerable damage to the crop itself. The early harvesters' rough handling of the tomatoes was improved somewhat by later designs, but the greater reduction in crop losses resulted from the development of new strains of tomatoes with hardy physical characteristics.

While the new tomatoes proved able to withstand the harvesting experience, they also were a much more difficult tomato to separate from the vine than earlier varieties. Tomato vines passed through the harvester and fell back to the ground with substantial numbers of tomatoes still attached.

Conventional tomato harvesters employ a shaker which accepts the severed tomato vines and subjects them to an oscillating forward and reverse action. Prior art shakers have been driven by a number of different mechanical drive units that effect the desired forward and reverse motion. For example, R. L. Button, U.S. Pat. No. 3,364,770 discloses a periodically varying drive mechanism, particularly suitable for use with a shaker conveyor. Similarly, Johnson, U.S. Pat. No. 3,721,132 illustrates an intermittent drive for shaker conveyer, such as might be used in a tomato harvester. Both devices exhibit a certain forward/reverse-acceleration/deceleration action which, if graphically depicted, approximates a sine-wave function. The sinusoidal action of both drive mechanisms stems from the use of a member tangentially interconnected to a rotating disc or wheel. This cycle-producing combination determines the overall characteristics of the shaker conveyer's reciprocating action.

The present invention relies on electronic rather than mechanical means to produce its control cycle. The electronic signal produced by the control circuitry exhibits a substantially square-wave characteristic in lieu of the sinusoidal cycle described above. In contrast to the relatively slow rate of change of the sine wave from 0° to 90°, and every quarter cycle thereafter, the square-wave displays a near instantaneous rate of change through each quarter-cycle.

The pulsating square-wave controls a solenoid-operated hydraulic valve. A pair of hydraulic motors is interconnected to a shaker conveyer such as a plurality of shaker chains, or the like. In an alternating fashion, one motor drives the conveyer forwardly and then the other drives the conveyer rearwardly at the command of the hydraulic valve. While the resultant mechanical motion cannot duplicate the instantaneous electronic control pulse, it resembles the square-wave function and is quite different from the sinusoidal shaking operation of prior art mechanisms known to applicants.

The quick, snapping action of a shaker bed driven by the present invention proves much more effective in separating comestibles from their supportive plant or vine than the comparatively restrained operation of prior art devices. Even the new generation of plants developed for machine harvesting can effectively be stripped of its fruit when subjected to the whip-like action of such rapid forward and reverse motion. Features which permit shaker frequency to be continuously variable assure that a frequency appropriate to the particular variety of comestible to be harvested can be chosen by the operator. Thus, losses which might result from over agitation of the crop can be easily avoided.

SUMMARY OF THE INVENTION

The invention relates to a drive system which produces a whip-like reciprocating action on tomatoes or the like in a shaker conveyer. The drive system includes a control box, a solenoid-operated hydraulic valve, a hydraulic pump and reservoir, and a pair of hydraulic motors.

The control box houses a multivibrator circuit producing a substantially square-wave output of continuously variable frequency. This output current, in turn, controls the action of a solenoid-actuated hydraulic valve. A hydraulic pump supplies a ready flow of fluid to the input gate of the valve. The hydraulic valve alternates fluid outflow from two discharge ports at a frequency in accordance with the control signal.

A pair of hydraulic motors is interconnected to the shaker conveyer drive assembly. Each motor is alternatively supplied with drive fluid from its respective valve discharge port. One motor effects a rapid forward motion of the shaker chain while the reverse motor free wheels. Then, the reverse motor is activated to reverse the movement while the forward motor free wheels. The duration of the drive pulse to the forward motor is slightly longer than that to the reverse motor, resulting in an overall forward movement of the shaker conveyer. A reservoir collects the fluid expelled from each hydraulic motor and provides a reserve from which the pump can draw.

In a practical harvesting situation, factors such as variety of fruit, maturity of the crop, and moisture content of the plant or vine affect the shake frequency required for maximum efficiency. An experienced operator can visually surmise the effectiveness of the shaker and adjust the frequency of the shaker cycle accordingly. The average net forward travel of the shaker is preferably adjusted to a speed slightly faster than the ground speed of the harvester. The present invention represents an improvement over prior art shaker mechanisms in that both shake frequency and shaker chain travel speed can be adjusted easily and independently so as to provide optimum separation of fruit and vine.

Other objects and advantages of the present invention will appear from the following description of a preferred embodiment.

DETAILED DESCRIPTION OF THE PREFERRED EMBODIMENT

Figure 1:
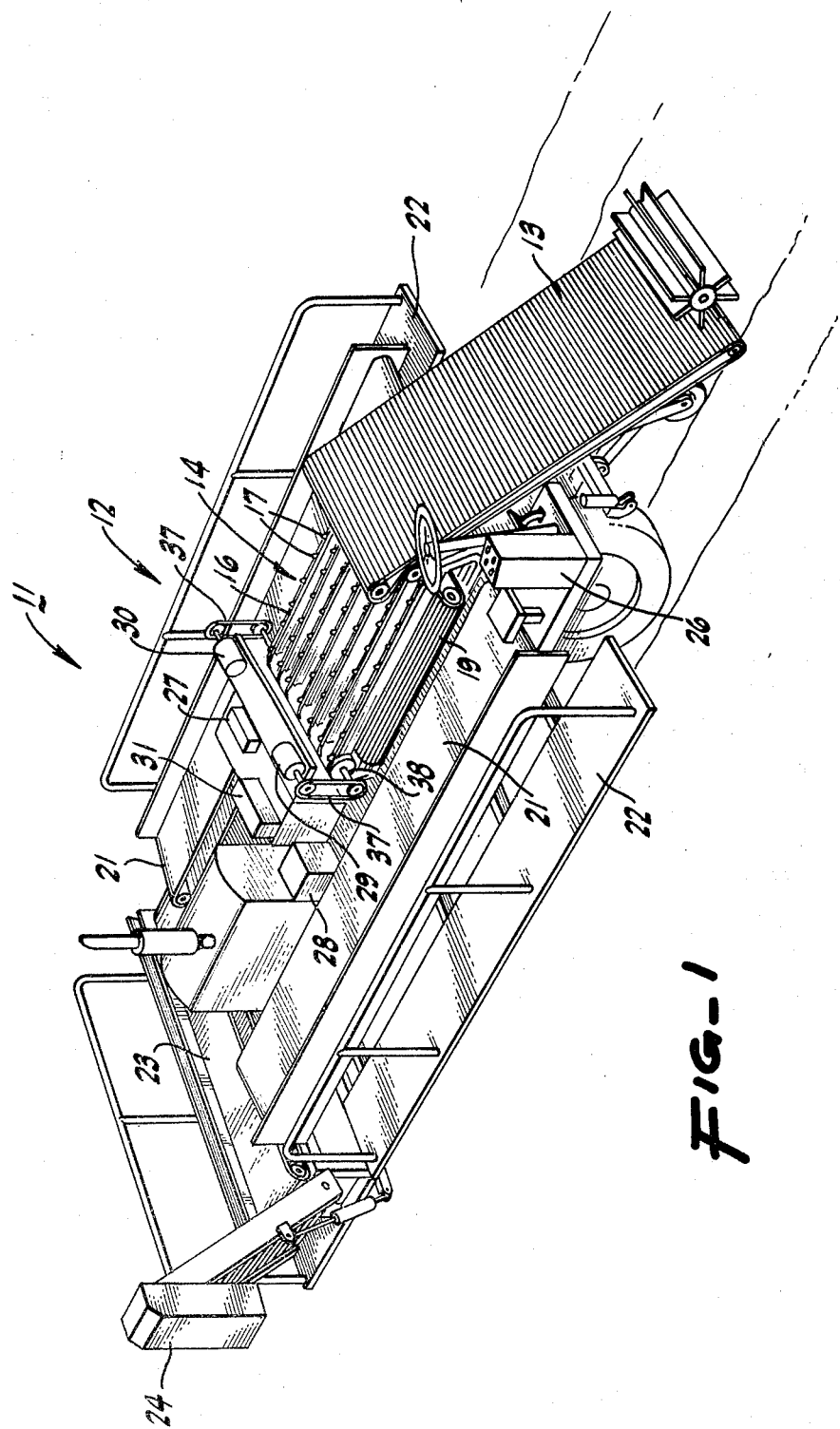
FIG. 1 is a perspective view of a conventional tomato harvester showing the shaker chain drive system, or shaker bed assembly, of the present invention installed thereon.

A standard mechanical tomato harvester 11 is illustrated in FIG. 1 the shaker chain agitator assembly of the invention 12 being shown in place of a conventional, mechanically derived shaker drive system. For the sake of clarity, FIG. 1 does not show hydraulic or electrical interconnection lines between the components of the shaker 12, but a subsequent portion of the description will deal specifically with these details.

A fore and aft upwardly and rearwardly inclined conveyer belt 13 transports the comestibles, most of which are still attached to their vines, above and then onto the adjacent end portion of a fore and aft shaker chain bed 14. A plurality of parallel, spaced apart fore and aft, endless shaker chains 16 is driven so as to translate first forwardly, and then rearwardly in a reciprocating fashion. Upwardly directed ears 17, or fingers, affixed to the chains 16, engage the loaded vines to effect a forward and rearward motion thereof. The forward stroke of chains 16 is longer than the rearward stroke, causing a net or overall forward travel of the vines over the shaker chain bed 14.

Figure 2:
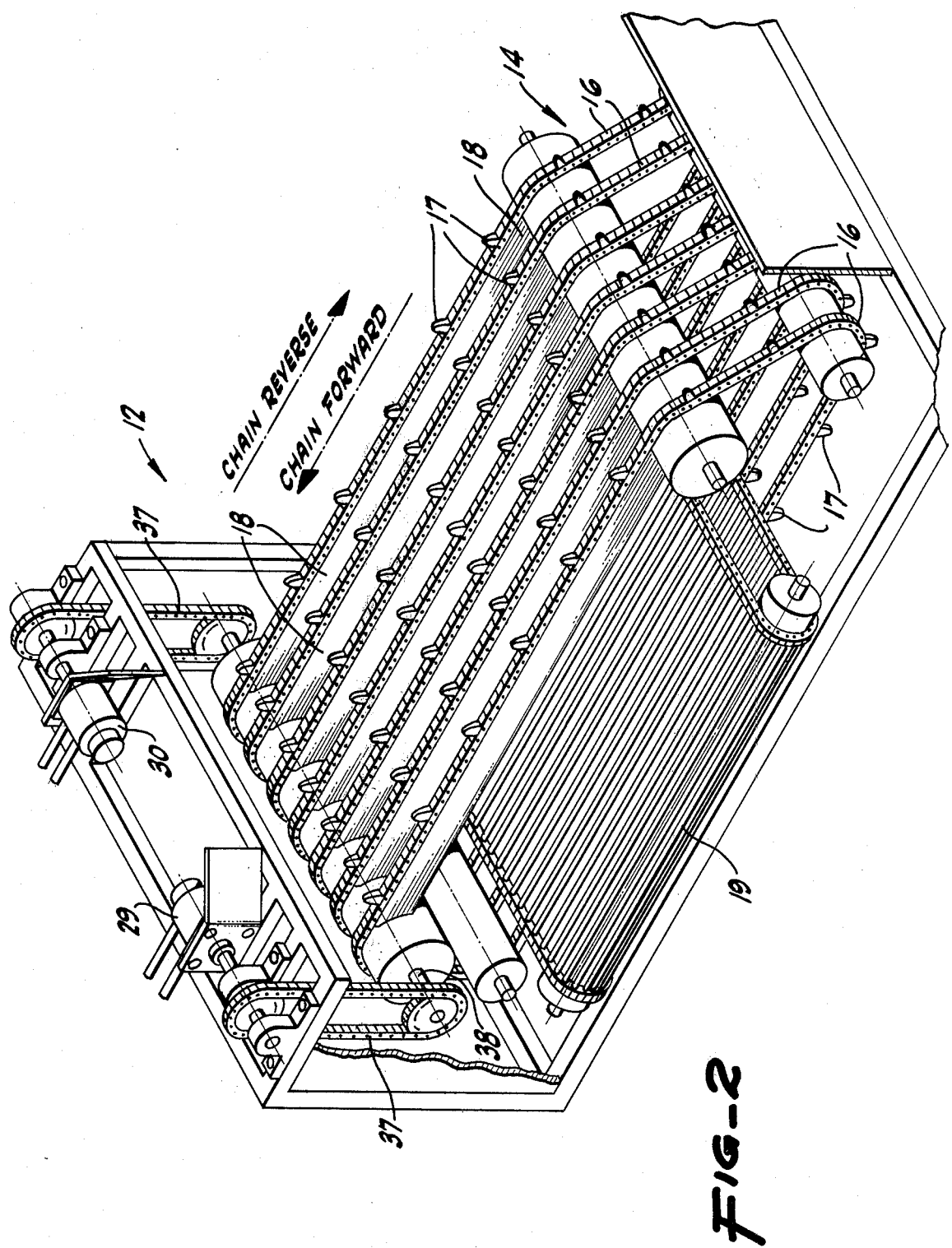
FIG. 2 is a perspective view of the shaker bed assembly, taken to an enlarged scale, showing the two hydraulic drive motors and associated mounting structure, one side of the shaker bed assembly being cut away to show the chain interconnection between one hydraulic motor and the shaker drive.

In connection with the shaker bed, the term "forward", when referring to the chain stroke means in a direction toward the discharge end of the shaker bed where the denuded vines spill over the end of the shaker bed and fall to the ground. In FIGS. 1 and 2 a "forward" stroke of the shaker chain is in a lefthand direction.

Owing to the sharp, oscillating forces acting upon the vines, the attached comestibles become separated from their respective vine stems. The freed comestibles pass downwardly through shaker bed apertures 18 intermediate the chains 16 onto one or the other of two bar conveyers 19 which transport the comestibles in opposite transverse directions. Dividing the load of dropping comestibles equally through the longitudinal dimension of the shaker chain bed 14, each bar conveyer 19 transports the fruit to opposite sides of the harvester 11. A pair of lateral, fore and aft sorting conveyers 21 accepts the discharge of comestibles from respective bar conveyers 19. As the fruit passes rearwardly on the sorting conveyers 21, it is culled by workers who stand on fore and aft, laterally extended platforms 22. The harvested fruit is then carried by a transverse conveyer 23 to an elevator 24 and then to temporary storage bins or to a large receiving tub carried on a trailer which moves alongside the harvester at harvester speed. Neither bins nor tubs are shown since they form no part of the present device.

Having presented the general operational scheme of the harvester 11, the specific of the present invention will now be disclosed, construction and function of the hydraulic hoses and fittings being omitted for clarity in FIGS. 1 and 2.

The shaker chain agitator of the invention 12 generally comprises a control box 26 located adjacent the driver's station, as shown in FIG. 1, along with a solenoid-actuated hydraulic valve 27, hydraulic pump 28, chain forward hydraulic motor 29, chain reverse hydraulic motor 30, and fluid reservoir 31.

Figure 3:
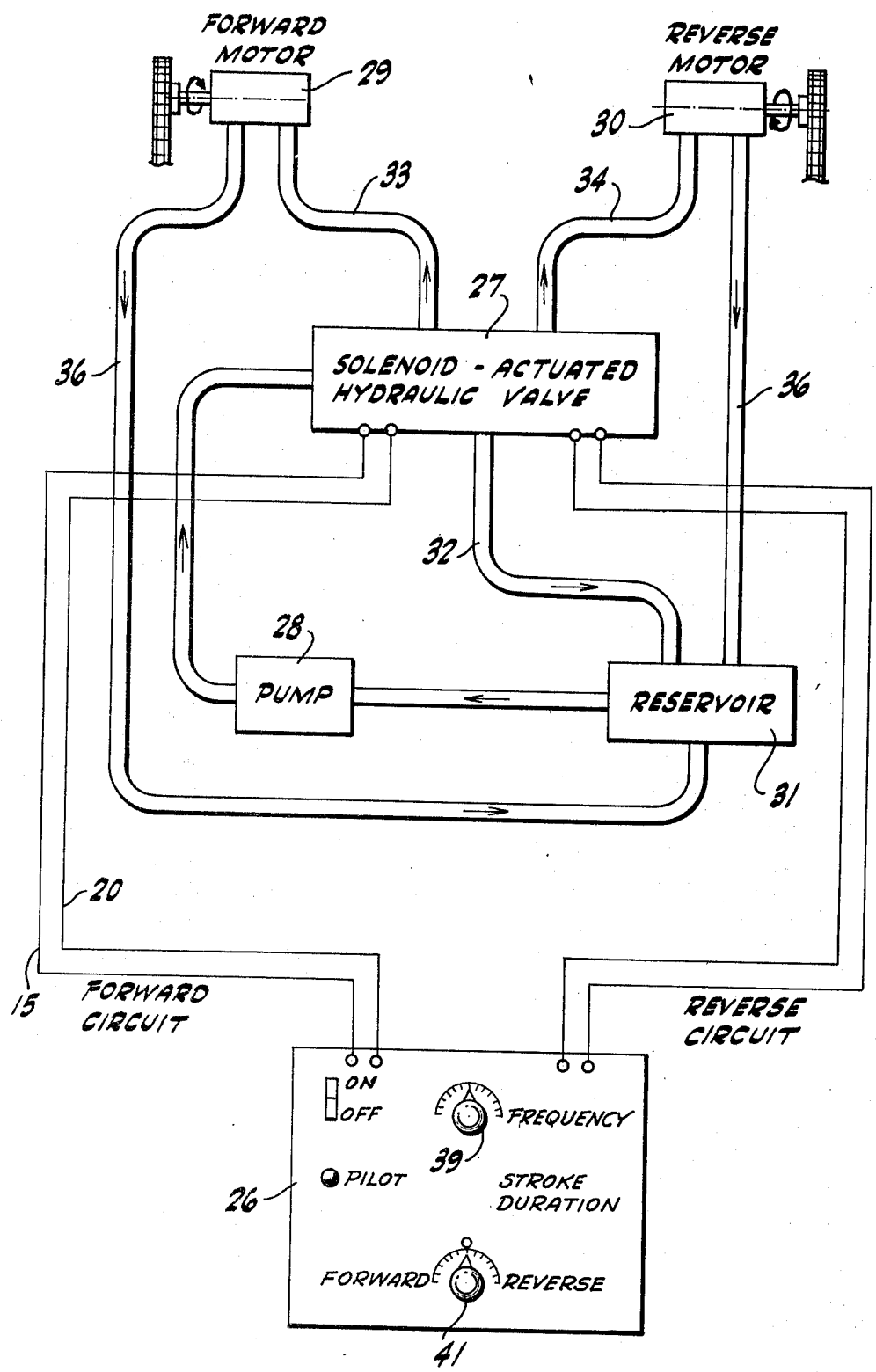
FIG. 3 is a diagrammatic representation of several of the basic elements of the invention, the hydraulic fluid lines including arrows to indicate flow direction and electrical lines being shown with polarity symbols.
Figure 4:
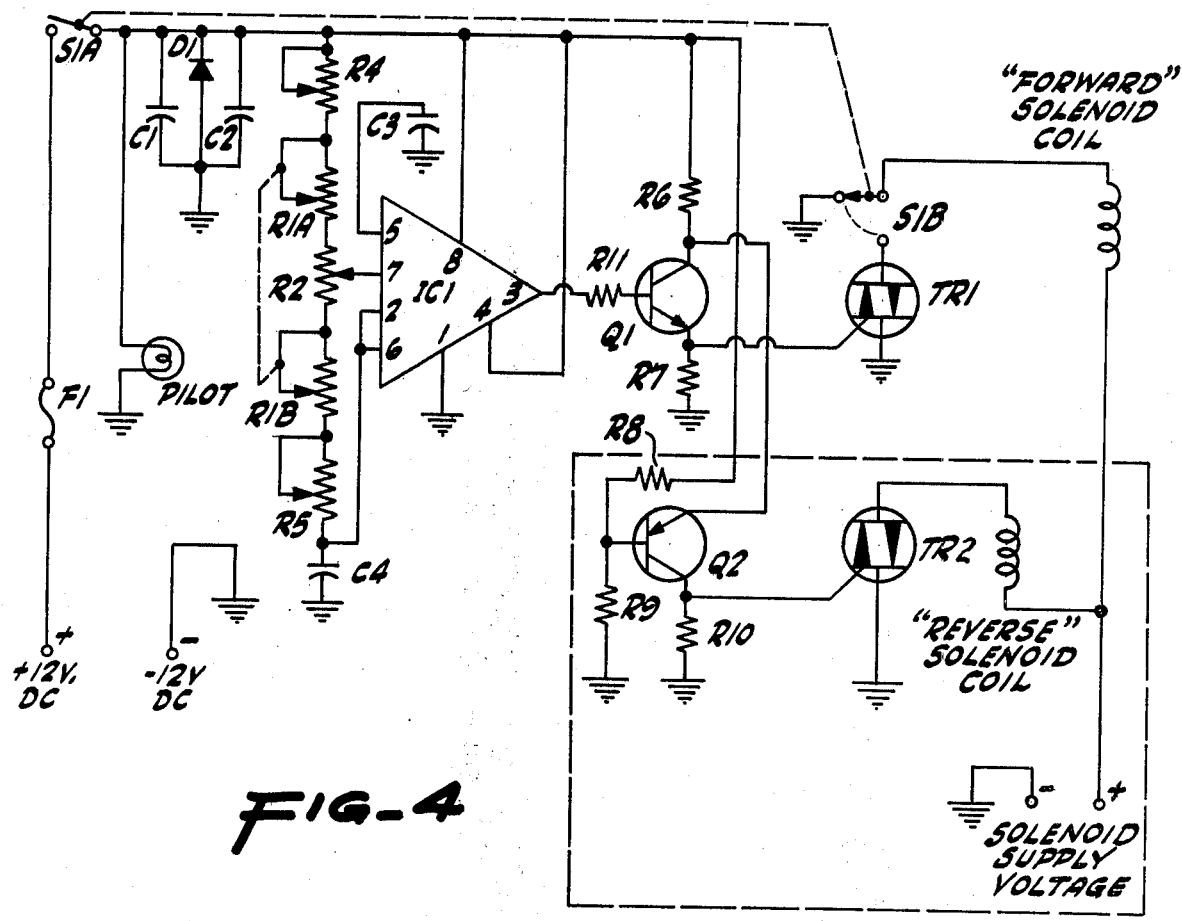
FIG. 4 is a schematic of the electrical circuitry of the control box, the dashed lines enclosing circuitry which could be eliminated if a single coil, spring return rather than dual coil, solenoid hydraulic valve were used.

FIG. 3 schematically shows the elements of the invention 12 and their electrical and hydraulic interconnections while FIG. 4 is an electrical circuit diagram.

Particular reference is had at this time to FIG. 4 showing the electrical portion of the device, serving to control the operation of the valve 27 and thus the motors 29 and 30.

When the driver throws switch S1, to the closed, or on, position, d.c. potential is applied to pin 8 of IC1, as the schematic in FIG. 4 shows. IC1 is connected as a free-running multivibrator which begins producing a square wave output at pin 3.

The frequency of the square-wave is determined by an RC combination of the total resistance between the pin 6 and the power source and the value of C4. R1A and R1B are ganged potentiometers which adjustably determine the running frequency of the multivibrator.

Figure 5:
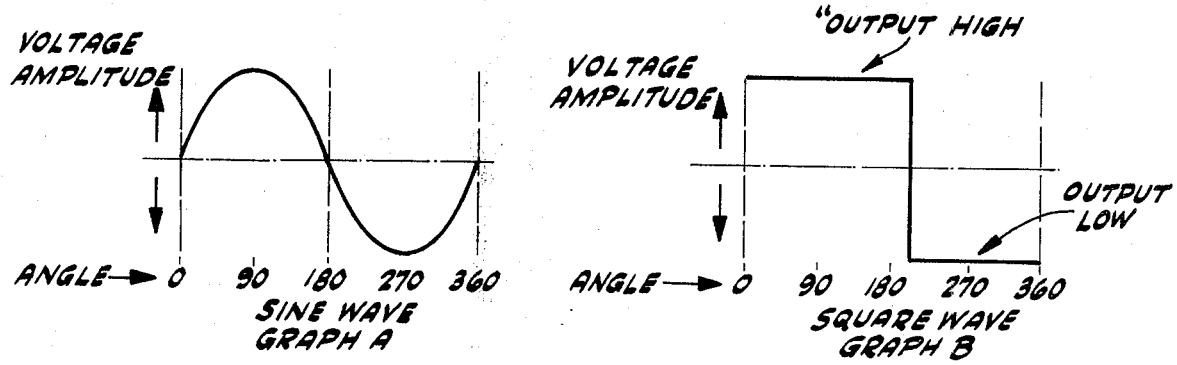
FIG. 5 is a graphical comparison of sine wave and square-wave electrical pulses.

R2 determines the relationship of the "output high" and "output low" portions of the square wave. In other words, by adjusting R2, the pulse width relationship of adjacent half cycles within one complete cycle can be modified. FIG. 5, Graph B, depicts the shifted time base relationship of the "output high" and "output low" pulses just described.

R4 and R5 are trim potentiometers which establish the overall frequency range within which R1A and R1B can adjust the particular frequency of operation desired.

The square wave output available at pin 3 of IC1 is used to bias on Q1 during the "output high" portion of the cycle. This causes the emitter voltage of Q1 to rise, gating on triac TR1. Since contact S1B interconnects the FORWARD solenoid coil and TR1 current can flow through TR1 to ground, thereby energizing the FORWARD solenoid coil of the hydraulic valve 27.

The solenoid controlled hydraulic valve 27 is of standard make and it is therefore believed that no detailed description of the internal components and their operation is deemed necessary.

During the "output low" portion of the cycle, Q1 is biased off, raising the collector voltage of Q1 to its maximum. This voltage is applied to the emitter of Q2, and causes the collector voltage of Q2 to rise. Triac TR2 is gated on by Q2 collector voltage, permitting current to flow through TR2 and the REVERSE solenoid coil to ground. Thus, the FORWARD and REVERSE solenoid coils are energized alternately, as TR1 and TR2 are gated on by the "output high" and "output low" portions of the square-wave, respectively. As a consequence of the particular pulse width differential determined by R2, the FORWARD and REVERSE coils are energized for different periods.

At the end of the "output low" portion of the square wave, the voltage at pin 3 of IC1 again returns to an "output high", and the cycle repeats itself.

Turning now to the component schematic of FIG. 3, the square wave output of the control box 26 is shown electrically interconnected to the solenoid-actuated hydraulic valve 27 by conductors 15 and 20. Arrows indicate the flow of hydraulic fluid from the pump 28, through the valve 27, and then to each hydraulic motor 29 and 30, alternately, according to the electrical control pulse. A by-pass drain 32 relieves the back pressure on the pump 28 as the hydraulic valve 27 is switching fluid between the forward drive line 33 and the reverse drive line 34. Each hydraulic motor has a drain line 36 which completes the hydraulic circuit to hydraulic fluid reservoir 31.

Hydraulic motors 29 and 30 are designed to "free wheel" when not being supplied with drive fluid. Thus, as FORWARD motor 29 is driving shaker chains 16 forwardly, REVERSE motor 30 merely "free wheels" and does not reversely pump hydraulic fluid. FORWARD motor 29 "free wheels" in an identical fashion when REVERSE motor 30 is being driven. Conventional drive chains 37 interconnect each hydraulic motor with the main drive shaft 38, as can be seen most clearly in FIG. 2.

The use of two hydraulic motors is ordinarily preferred owing to a resultant higher reliability factor and decreased wear. Nevertheless, one experienced in the art could readily modify the preferred, two motor version by replacing the two motors with a single, reversible hydraulic motor capable of being driven by the alternating fluid drive of lines 33 and 34.

Another version of the invention involves the use of a single solenoid, spring return hydraulic valve. The use of such a valve obviates the need for the circuitry enclosed by the dotted lines shown in FIG. 4. No "output low", reverse control signal is required since the spring return feature of the valve ensures fluid flow to the REVERSE motor when the FORWARD solenoid coil is not energized. The use of the dual coil hydraulic valve is preferred, however, because it provides a quicker acting, positive control over the reverse cycle. Having an active element of control over the mechanical movement of the hydraulic valve provides uniformity of shaker bed forward and reverse motion. That is to say, the mechanical spring return version cannot supply reverse drive fluid in the same punctuated fashion as the dual coil version.

Figure 6:
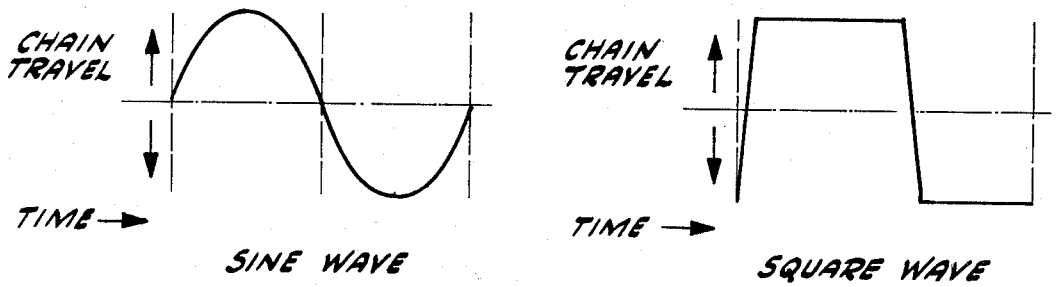
FIG. 6 is a graphical comparison of shaker bed action with a conventional rotary drive and with an electrohydraulic drive of the present invention.

FIG. 6 shows a comparison between the mechanically derived, drive control system of the prior art and the electronically derived, drive control system of the present invention in actual operation. The significant difference in rates of acceleration points to the advantage of the electro-hydraulic shaker chain drive.

Not only are the shaker bed forces greater, but the precise electronic control over the drive system enables the operator to vary the frequency of the whip-like, snapping action as well as speed of overall shaker travel. The panel of the control box 26 (see FIG. 3) includes a frequency control knob 39 which adjusts ganged potentiometers R1A and R1B (see FIG. 4) and a stroke duration control knob 4 which adjusts R2 (see FIG. 4). These two controls give the operator complete and independent command over shaker operation that has not heretofore been possible. Thus the present invention provides a unique and improved drive system for harvesting machine shakers that enables the farmer to gain maximum benefit from technologically advanced harvesters and the new strains of crops.

We claim:

1. A shaker for separating comestibles from their plants and including a plurality of fore and aft shaker chains movable in a fore and aft direction and a plurality of fingers upstanding from said chains, said shaker comprising:
   a. means for translating comestibles and plants engaged by said fingers first in one direction and then in the opposite direction at a rate in the range of two to three cycles per second; said translating means comprising at least two hydraulic motors capable of translating said shaker chains linearly in either direction, one of said motors being effective intermittently to drive said shaker chains in a forward direction, the other of said motors being effective intermittently and out of phase with said one of said motors to drive said shaker chains in a rearward direction; a solenoid-operated hydraulic valve capable on demand of supplying and routing pressurized hydraulic fluid to said hydraulic motors so as to effect forward and rearward translation of said shaker chains; and, electrical means for producing a pair of voltage pulses of predetermined duration and frequency for actuating said valve in a predetermined sequence to control the routing of pressurized hydraulic fluid to said motors;
   b. means for removing the comestibles separated from the plants; and,
   c. means for discarding the denuded plants.

2. A shaker for separating comestibles from their plants comprising:
   a. elongated shaker means adapted to support and engage the plants bearing the comestibles;
   b. at least one hydraulic motor operatively coupled with said shaker means for linearly moving said shaker means;
   c. a source of pressurized hydraulic fluid;
   d. valve means connecting said motor with said fluid source;
   e. and electronic control means operatively coupled with said valve means for energizing said motor so that said motor alternatingly moves said shaker means in opposite directions, said valve means being adapted to apply substantially instantaneously the full pressure of the hydraulic fluid to said motor so that said motor correspondingly substantially instantaneously accelerates and decelerates said shaker means in opposite first and second directions and further moves said shaker means at a relatively constant speed between respective accelerations and decelerations thereof whereby the comestibles are subjected to short-lasting bursts of high acceleration and deceleration forces facilitating the separation of the comestibles from the plants.

3. A method for separating comestibles from their plants on an elongated shaker comprising the steps of: introducing the plants onto one end of the shaker; and reciprocating the shaker in alternating forward and rearward directions by
   a. substantially instantaneously accelerating the shaker in a first direction;
   b. maintaining the speed of the shaker in the first direction at a substantially constant value and over a first, relatively extended time interval;
   c. substantially instantaneously reversing the direction of movement of the shaker at the end of the time interval so that the shaker then accelerates substantially instantaneously in a second, opposite direction;
   d. moving the shaker in the second, opposite direction at a relatively constant speed and over a second, predetermined time interval;
   e. thereafter substantially instantaneously decelerating the skaker to arrest the shaker movement in the second direction; and, f. repeating steps a. to e. at the instant shaker movement in the second direction ceases, thereby resuming the cyclical subjection of the comestibles attached to the plants to high acceleration and deceleration forces facilitating the separation of the comestibles from the plants.

4. A method according to claim 3 wherein the length of the first interval exceeds the length of the second interval, and wherein the shaker speeds in the first and second directions is substantially equal so that the combined shaker movements during b. and d. carries the plants from one end to the other end of the shaker.

5. A method according to claim 3 wherein the duration of the intervals exceeds the duration of the combined accelerating, decelerating and reversal steps.

6. A method according to claim 5 wherein the duration of the intervals exceeds the duration of the combined accelerating, decelerating and reversal steps by a factor of at least two.

7. A method according to claim 3 wherein the acceleration, reversal and deceleration rates of steps a., c. and e. substantially exceeds gravity force g.

* * * * *